Dec. 30, 1947.    P. H. WILLIAMS    2,433,679
INDIAN CURRENCY COMPUTING AND RECORDING CALCULATOR
Filed Oct. 9, 1942    5 Sheets-Sheet 1

| DATE | MEMO. | DEBIT | CREDIT | BALANCE. | PICK-UP |
|---|---|---|---|---|---|
| APR. 1 | BROT FWD. DEPOSIT. DISBURSEMENTS. | 279  281 2,130.10.11 | 279  281 126.15.3 | 283  285 2,10,33,465.15.11 2,10,35,469.11.7 | 2,10,33,465.15.11 2,10,35,469.11.7 |
| 3 | DEPOSIT DISBURSEMENTS | 921. 9.10 | 500.12.2 | 2,10,35,790. 9.3 | 2,10,35,790. 9.3 |
| 6 | DISBURSEMENTS | 278  280 | 1,333. 2.1 278  280 | 2,10,34,457. 7.2 282  284 | 2,10,34,457. 7.2 |

Paul H. Williams
Inventor

By Earl Benst
His Attorney

Dec. 30, 1947.    P. H. WILLIAMS    2,433,679
INDIAN CURRENCY COMPUTING AND RECORDING CALCULATOR
Filed Oct. 9, 1942    5 Sheets-Sheet 2

Paul H. Williams
Inventor
By Kearl Benst
His Attorney

Dec. 30, 1947.    P. H. WILLIAMS    2,433,679
INDIAN CURRENCY COMPUTING AND RECORDING CALCULATOR
Filed Oct. 9, 1942    5 Sheets-Sheet 3
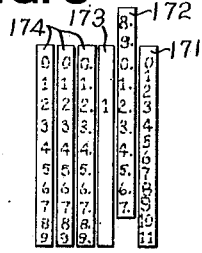
FIG. 5
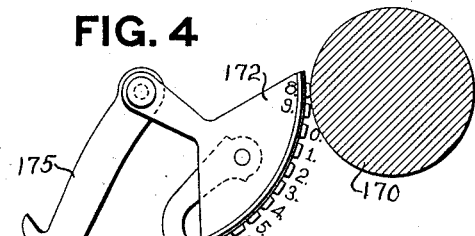
FIG. 4
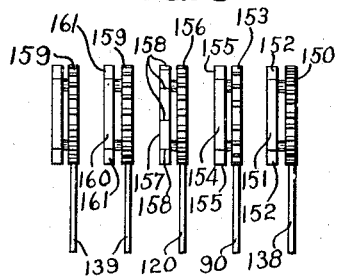
FIG. 6
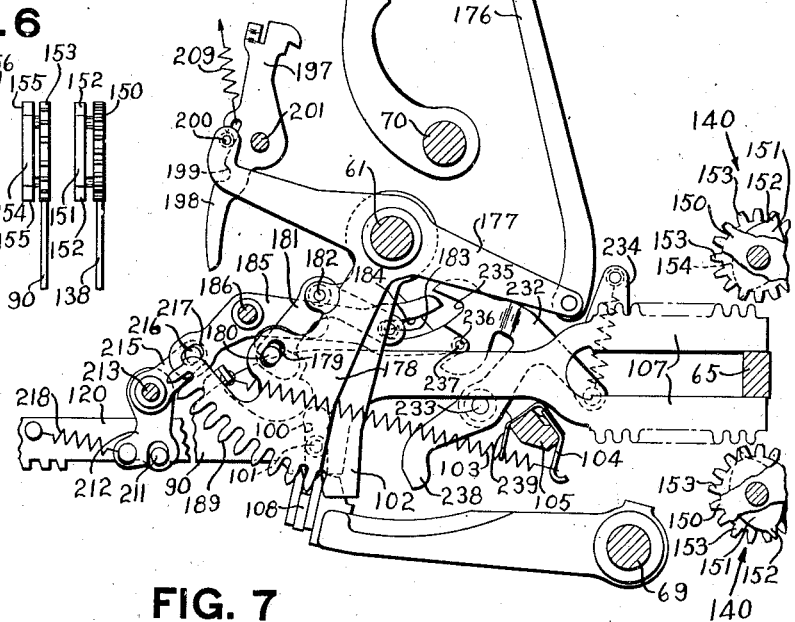
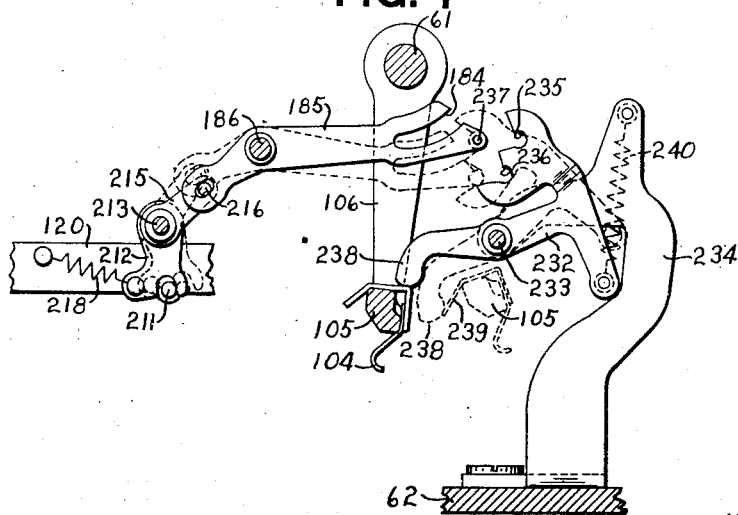
FIG. 7
Paul H. Williams
Inventor
By Carl Berst
His Attorney Dec. 30, 1947.   P. H. WILLIAMS   2,433,679
INDIAN CURRENCY COMPUTING AND RECORDING CALCULATOR
Filed Oct. 9, 1942   5 Sheets-Sheet 4
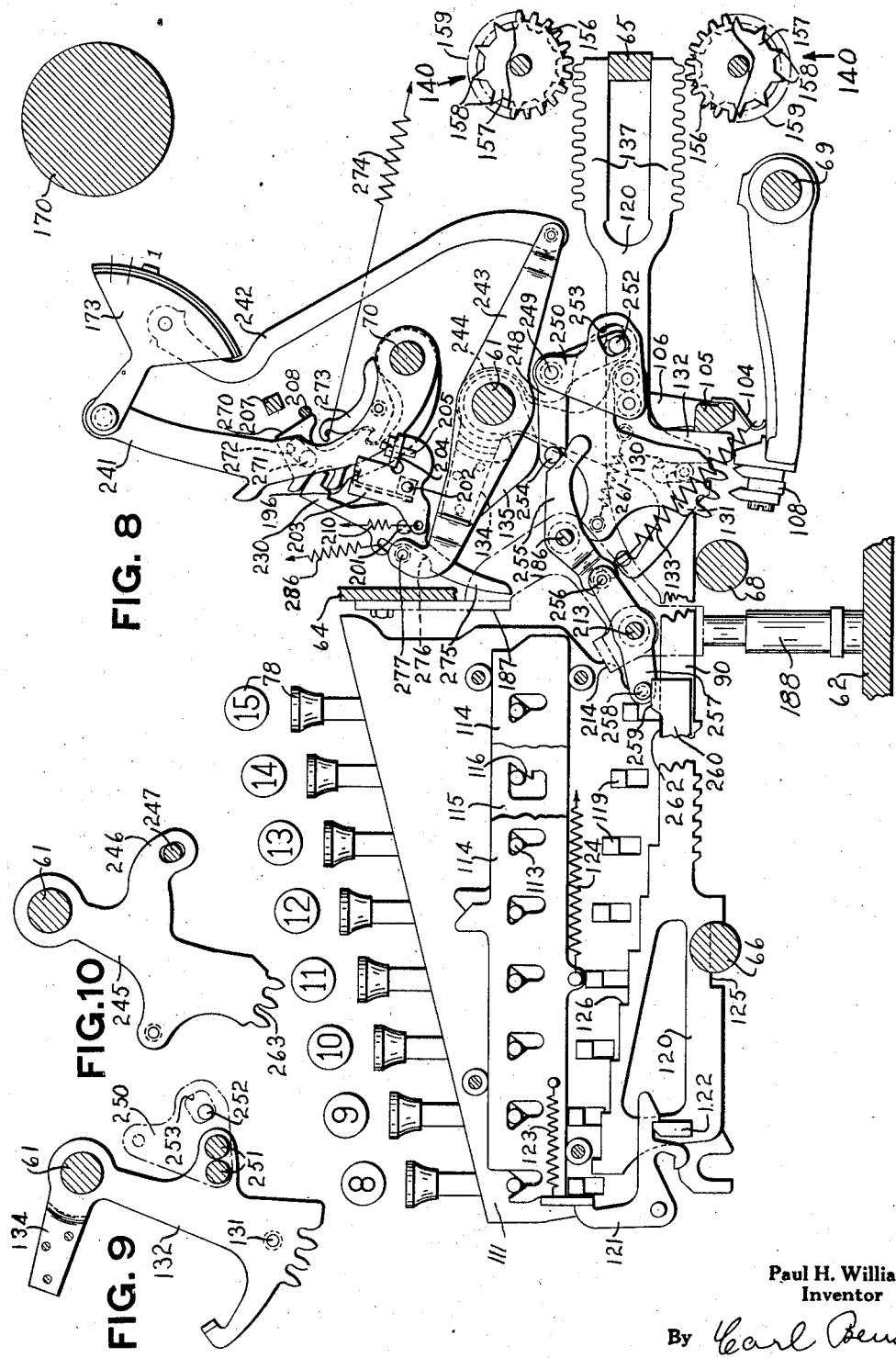
Paul H. Williams
Inventor
By Carl Benst
His Attorney Dec. 30, 1947.  P. H. WILLIAMS  2,433,679
INDIAN CURRENCY COMPUTING AND RECORDING CALCULATOR
Filed Oct. 9, 1942  5 Sheets—Sheet 5

Paul H. Williams
Inventor
By Carl Benst
His Attorney

Patented Dec. 30, 1947

2,433,679

UNITED STATES PATENT OFFICE 2,433,679

INDIAN CURRENCY COMPUTING AND RECORDING CALCULATOR

Paul H. Williams, Dayton, Ohio, assignor to The National Cash Register Company, Dayton, Ohio, a corporation of Maryland Application October 9, 1942, Serial No. 461,458

12 Claims. (Cl. 235—60)

This invention relates to printing mechanism and the control thereof for accounting machines particularly of the type shown and described in the following United States patents: to Halcolm Ellis, Nos. 1,197,276 and 1,197,277, dated September 5, 1916, and No. 1,203,863, dated November 7, 1916; to Raymond A. Christian, No. 2,038,717, dated April 28, 1936; and to Paul H. Williams et al., No. 2,189,851, dated February 13, 1940.

More specifically, this invention involves the control of printing mechanism for Indian currency of pies, annas, and rupees, wherein 12 pies equal 1 anna, and 16 annas equal 1 rupee.

To accumulate these various amounts in the totalizers of machines of the above-mentioned type involved merely the provision of the proper numbers of transfer controls from pies to annas and from annas to rupees. The transfer from pies to annas is accomplished by the use of the usual English transfer from pence to shillings. In other words, whenever 12 pies have been added into the "pies" denomination totalizer wheel, the transfer means is actuated to cause 1 anna to be added into the "annas" denomination totalizer wheel. To register the pies, there are provided eleven keys ranging from 1 to 11, which control the setting, or differential movement, of a single rack. Also controlled by this single rack is a type segment having characters 1 to 11 to print the pies as they are registered.

For the registration of annas in the present invention, in order to use standard equipment as far as the racks and the totalizer are concerned, there are provided two rows of keys, two totalizer wheels for annas, and two differential members or racks to actuate their associated totalizer wheels under control of the two banks or rows of anna keys. One row has keys 1 to 7 and the other row has keys 8 to 15, and the transfer means between the two anna totalizer wheels is effected each time the "1 to 7" wheel has 8 annas added thereto, whereby the "8 to 15" wheel will be moved one step. This "8 to 15" wheel is controlled by the keys 8 to 15 and is moved one step each time any one of said keys 8 to 15 is depressed, because the rack associated with these keys is given one step of movement only under control of any of said keys 8 to 15. The "8 to 15" wheel has 20 teeth and has a 10-point transfer member thereon, so that, each time this "8 to 15" wheel is moved two steps, it effects a transfer into the lowest order rupee wheel of the totalizer.

It can be seen from the above that the totalizer wheels and the racks therefor are standard; that is, the pies wheel and rack are regular English 12-point division members with the regular transfer from pies to annas each time 12 pies have been added into the "pies" wheel. Moreover, the two anna wheels and racks are the standard decimal or 10-point division members, the "1 to 7" rack and wheel move differentially under control of the "1 to 7" anna keys, and the "8 to 15" rack and wheel are arranged to move one step under control of any of the "8 to 15" keys and one step under control of the transfer from the "1 to 7" wheel each time it passes seven steps of movement, whereby the "8 to 15" wheel, having one step imparted to it by a transfer and one step given to it under control of the "8 to 15" keys, will then transfer "1" into the lowest order rupee wheel due to the transfer points' being arranged for each two steps of movement.

However, to control the printing members associated with the "1 to 7" and "8 to 15" racks necessitated the inclusion of novel mechanism under control of the keys and racks in order to get the proper characters presented to the printing line so that the amounts printed will correspond to the amounts set up on the keyboard. The printing of the "pies" is simple and standard construction, since the type segment for "pies" is connected to the pies 12-point rack and is differentially positioned under control of the pies keys 1 to 11. The printing of the rupees is standard construction also.

Therefore an object of this invention is the provision of novel means to control the printing of special amounts from an actuating means which controls the addition of such special amounts into regular or standard totalizer wheels.

Another object is the control of the printing of amounts having a special unit base division by means having a different unit base division.

Another object is the novel control of the printing of two special denominations of a monetary system, which control includes special actuating means for the two special type carriers for these special denominations.

A further object of this invention is the novel control of the printing of characters, representing a special denomination, under the joint control of a plurality of banks of keys.

Another object is to control printing from a plurality of printing members under the sole control of either a single one of a plurality of banks of control keys and/or the joint control of all of said banks of keys.

A still further object of this invention is the control of a plurality of printing members by any key in one bank of keys and certain keys in another bank of keys when operated individually and also to control said members by the joint operation of keys of all banks.

Another object is to provide a plurality of banks of control keys, a plurality of associated printing members, means intermediate each bank of keys and its associated member to directly control the latter from its bank of keys, and mechanism controlled by said means to vary the control of the printing members when certain keys are operated in said banks.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 4 shows the control of the printing of the "0 to 9" annas printing member by the "8 and 9" anna keys, the parts being in their moved or printing positions.

Fig. 5 is a diagrammatic view of the printing members for Indian currency.

Fig. 6 is a diagrammatic view of the totalizer wheels and racks for Indian currency.

Fig. 7 shows the aligning mechanism associated with the printing control means of the "8 to 15" annas key bank.

Fig. 8 is a section through the machine, showing the control of the "10 to 15" annas printing member by the "8 to 15" anna keys in one bank and the "1 to 7" anna keys of the adjacent bank, all parts being in normal positions.

Fig. 9 is a detail of the rack driving lever for the "8 to 15" anna keys.

Fig. 10 is a detail of the lever for the "10 to 15" anna printing member, which lever is controlled by the "1 to 7" anna keys.

GENERAL DESCRIPTION

Figures 1, 2:
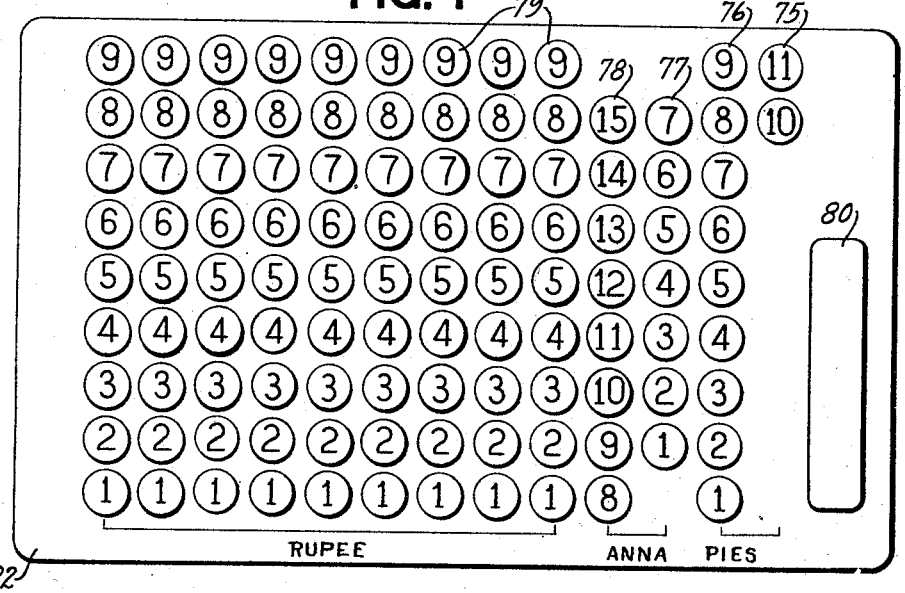
Fig. 1 is a diagrammatic view of the keyboard of a machine embodying the present invention.
Fig. 2 is a facsimile of a portion of a record card showing the printing of amounts using the Indian currency system of pies, annas, and rupees.

Described in general terms, this invention relates to and involves the control of the printing of the annas denomination of amounts used in the Indian currency.

The particular problem involved was to use as much of a standard machine, of the well-known type of accounting machine shown and described in the previously mentioned patents, for the registration of Indian currency amounts and for the printing of such amounts as they were registered and the printing of totals of such amounts. The printing of the several amounts as they are registered is under control of banks of keys, and the printing of the accumulated totals of such amounts is under control of the totalizers in which such amounts have been accumulated.

In machines of the type above mentioned, the printing members are usually set directly by the adding racks, which in turn are controlled by keys in adding operations and by the totalizers in total-printing operations.

Due to the fact that, in the Indian currency system, 12 pies equal 1 anna and 16 annas equal 1 rupee, there are one bank of keys "1 to 11," one rack, and one totalizer wheel for the pies; and two banks of keys, "1 to 7" and "8 to 15," two racks, and two totalizer wheels for the annas.

The two banks of anna keys and the racks associated therewith are constructed so that depression of an anna key 1 to 7 controls its associated rack to move a number of steps designated by the particular keys depressed, and depression of any one of the anna keys 8 to 15 releases the rack associated therewith to move one step. One step of movement of the rack associated with the keys 8 to 15 causes 8 annas to be entered into the anna wheel. Depression of an anna key 8 to 15 also depresses the anna key 1 to 7 adjacent thereto. Thus, for example, if the "9" anna key is depressed, the "1" anna key is also depressed. Under this condition, the rack associated with the "9" anna key adds "8" into the anna totalizer, and the rack associated with the "1" anna key adds "1" into the anna totalizer a total of "9." Since no key is adjacent the "8" anna key, depression of the "8" key releases only the rack associated with the "8" to "15" keys to add "8" into the anna totalizer.

Therefore, to register 1 to 7 annas, the "1 to 7" rack is differentially moved under control of the "1 to 7" keys in one bank, and to register 9 to 15 annas, this same rack is moved from one to seven steps, and at the same time the "8 to 15" anna wheel is moved one step to add 8 annas, thus completing the proper registration. This is because each step of the "8 to 15" anna wheel is equal to 8 annas, so that each time the "8 to 15" annas totalizer wheel is moved one step, "8" annas are added into the totalizer.

The "8" annas key causes the "8 to 15" rack to move one step to add "8" on the "8 to 15" annas wheel. Thus, by using a 16-tooth "1 to 7" wheel with a 2-point standard transfer, and a 20-tooth "8 to 15" wheel with a 10-point transfer, the proper annas of 1 to 15 can be accumulated and transferred into the rupee wheel whenever 16 annas have been accumulated.

Should an overdraft occur, the regular overdraft mechanism used in machines of this type functions in its usual manner, for both registering and recording such overdrafts, as is shown and described in the above-mentioned Christian Patent No. 2,038,717.

Now, in order to properly print the annas as they are registered, due to the fact that the printing members are set by the "1 to 7" and the "8 to 15" anna racks, it becomes necessary to supplement the movements of these racks by novel control or compensating devices controlled by these racks and the two banks of anna keys.

These same compensating devices function to control the printing of the annas under control of the two anna wheels when totals are printed from them.

DETAILED DESCRIPTION

In the description of the present invention, only so much of the standard accounting machine will be described as is necessary to give a complete understanding of the invention and its working.

Operating mechanism

The machine embodying the present invention is an accounting machine of the well-known Ellis type illustrated and described in the previously mentioned patents.

The machine may be operated by an electric motor of the conventional design shown in the United States patent to F. W. Bernau, No. 1,601,102, dated September 28, 1926, or the United States patent to Charles H. Arnold, No. 2,142,341, dated January 3 1939.

Figure 3:
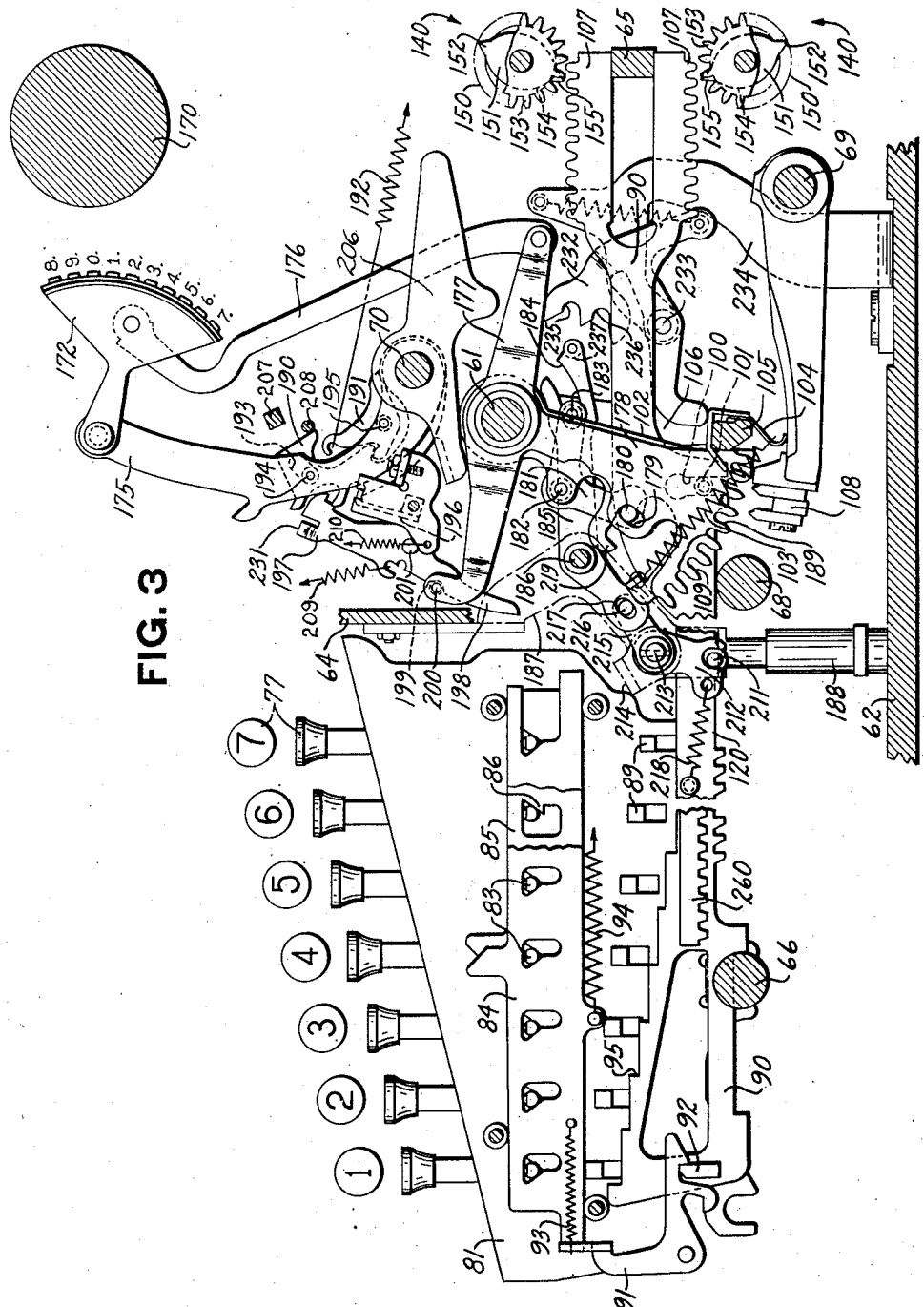
Fig. 3 is a section through the machine, showing the control of the "0 to 9" annas printing member by the "1 to 7" anna keys in one bank and the "8 and 9" anna keys of the adjacent bank, all parts being in normal positions.

Such a motor causes an oscillation or operating motion, first counter-clockwise and then clockwise, of a shaft 61 (Figs. 3, 4, and 8) as illustrated and described in the Christian, Bernau, and Arnold patents mentioned above. From this shaft 61 are derived the power and motion to operate the machine.

Framework

Figure 14:
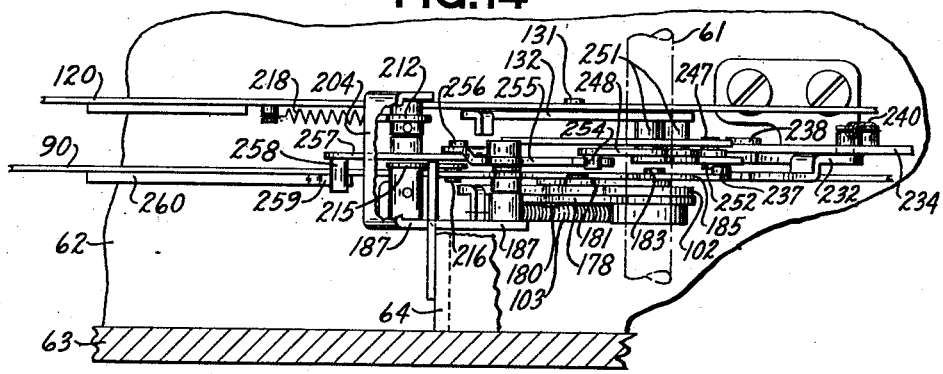
Fig. 14 shows, in top plan, a portion of the controls shown in Figs. 3, 4, 8, and 13.

The mechanism is supported by a framework including a base 62 (Figs. 3 and 14) having side frames 63 (only one being shown) which are connected by a cross frame 64 and tie bars 65 and 66.

The side frames 63 support a shaft 68 (Figs. 3 and 8), which is a part of the motor drive mentioned above; an aligner shaft 69; a printer drive shaft 70; and the operating shaft 61 described above.

Keyboard

The keyboard is shown diagrammatically in Fig. 1 and consists of two rows of keys 75 and 76 to register pies; two rows of keys 77 and 78 to register annas; and nine rows of keys 79 to register rupees. These keys control the registration and printing of any of the denominations above mentioned for the Indian currency. The usual motor release bar 80 is also shown in Fig. 1.

The only part of the keyboard which has been shown in detail is the two banks of anna keys 77 and 78. The rupees keys 79 are of standard construction, and the pies keys 75 and 76 are also of standard construction.

The construction of the annas keys 77 and 78 is special and novel, and their control over the printing of the amount of annas is also very special and novel.

The annas keys 77 are mounted on the usual key plate 81, the lower edge of which is slotted to straddle the tie bar 66 (Fig. 3) and the top edge of which contacts and is secured to the usual cover plate 82 (Fig. 1). Each of the keys 77 has a pin 83 (Fig. 3) cooperating with a zero stop control bar 84, which is supported by the plate 81 in the usual manner. A locking detent 85, partially shown, serves in the usual manner to lock down any depressed key 77, through the cooperation of a lug 86 and the pin 83.

Figure 11:
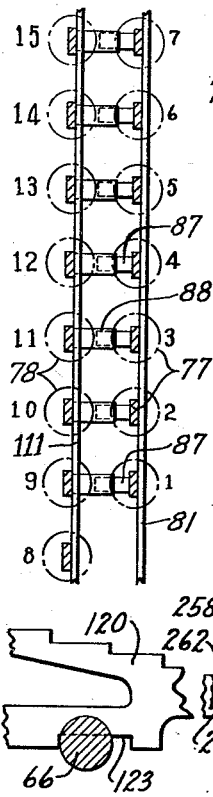
Fig. 11 is a diagrammatic view showing the inter-control relation between the "1 to 7" anna key bank and the "8 to 15" anna key bank.

Each key 77 also carries a square pin 87 (Figs. 11 and 12), which cooperates with a pin 88 on the key 78 directly opposite, as shown in Fig. 11.

Each key 77 also carries the usual pin 89 to control the differential movement of an associated rack 90, held in its normal position by a zero stop pawl 91. The rack 90 is guided by the tie bars 65 and 66. The pawl 91 engages a lug 92, and the upper end of the pawl is held in contact with the bar 84 by a spring 93. The bar 84 is normally drawn to the right (Fig. 3) by a spring 94.

Depression of a key 77 moves, through its pin 83, the bar 84 to the left, thus rocking the pawl 91 and releasing the rack 90, which is then moved to the right differentially under control of the pins 89, which cooperate with differential steps 95 of the rack 90 in the usual manner.

The rack 90 has a slot 100 engaged by a pin 101 of an operating lever 102 pivoted on the shaft 61. A spring 103, connected to the lever 102, and a finger 104 on a bail 105 of a leading frame hold the lever 102 against the bail 105. This bail is carried by arms 106 (only one of which is shown) secured to the operating shaft 61.

At the proper time after the key 77 is depressed, the shaft 61 is rocked counter-clockwise, as described above, whereupon the bail 105 is moved to the right, the spring 103 rocks the lever 102, and the pin 101 moves the rack 90 until one of its shoulders 95 contacts the pin 89 of the depressed key 77. When the rack 90 stops, the continued movement of the bail 105 merely stretches the spring 103. Near the end of the operation, the shaft 61 moves the bail 105 back to normal position to restore the lever 102 and the rack 90 to their normal positions.

The rack 90 has the usual two sets of teeth 107 for operating its associated totalizer wheels, to be described later.

An aligner 108, secured to the shaft 69, is operated in the usual manner to properly align the rack 90 and associated parts by engaging notches 109 in the lever 102.

The annas keys 78 (Figs. 8 and 11) are mounted on a key plate 111 slotted to embrace the tie bar 66. The plate 111 is also connected to the cover plate 82. Each key 78 has a pin 113 cooperating with a zero stop control bar 114 mounted on the plate 111. A locking detent 115, partially shown, serves to lock down any depressed key 78, through its lug 116 riding over the pin 113. A pin 119 on each key serves as a guide for the key, but in this bank it does not cooperate with the rack 120, since the rack, for reasons described later, receives only one step of movement regardless of which key 78 is depressed.

This rack 120 is held in normal position by a zero stop pawl 121, which engages a lug 122 of the rack 120. The upper end of the pawl is held in contact with the bar 114 by a spring 123, and a spring 124 holds the bar 114 in the position shown until a key 78 is depressed, which moves the bar 114 to free the pawl 121 from the rack 120. The rack 120 has a short notch 125, which allows the rack to move only one step when the pawl 121 is disengaged, the tie bar 66 acting as the limiting or stopping means for the rack. The steps 126 of the rack 120 do not control, as they do not contact any of the pins 119.

The rack 120 has a slot 130 engaged by a pin 131 of an operating lever 132 pivoted on the shaft 61, and a spring 133 connected to the lever 132 and to the finger 104 of the leading frame bail 105 moves the lever 132 and the rack 120 one step each time one of the "8 to 15" annas keys 78 is depressed.

In order to provide a good bearing for the lever 132, it has a bent arm 134 (Figs. 8 and 9), to which is secured an arm 135, which also bears on the shaft 61.

The rack 120 has two sets of teeth 137 to cooperate with the annas wheels of the totalizers, to be described later. The aligner 108 cooperates with notches 136 of the lever 132 to align the rack 120 and associated parts.

There is a rack 138 (Fig. 6) associated with and controlled by the two banks of pies keys 75 and 76. This one rack 138 is controlled by both banks of keys 75 and 76. It is of the standard 12-division type for English currency, and, since 12 pies equal 1 anna, there need be no change in the rack for registering purposes in connection with the totalizer wheel and printing member to be described later.

There is also a standard 10-division rack 139 associated with each of the banks of rupees keys 79 for cooperating with the rupees wheels of the totalizer and printer.

Totalizers

There are two totalizers, numbered generally as 140 (Figs. 3, 4, 5, 6, and 8). One is associated with the lower sets of teeth on the racks 90, 120, 138, and 139, and one is associated with the upper sets of teeth on said racks. A part of one of said totalizers is shown diagrammatically in Fig. 6. These totalizers are adapted to be moved into engagement with the racks for adding, subtracting, sub-totaling, and totaling in the usual manner, as shown and described in the above-mentioned patents to Ellis, Christian, and Williams et al. Therefore the engaging and disengaging means has not been shown. Moreover, the carry or transfer mechanism has been only partially shown, since it is like that shown in said last-mentioned patents.

Since the currency being dealt with in this case is the Indian currency, a brief description of the totalizer wheels and the transfer disks associated with the wheels will be given.

For the "1 to 11" pies banks of keys 75 and 76, a 24-tooth wheel 150 (Figs. 3, 4, and 6) is used. This wheel has a transfer disk 151 having two transfer points 152, so that, each time 12 pies are added into the wheel 150 by the rack 138, "1" is transferred into the lower order annas wheel 153.

The annas wheel 153 has 16 teeth and is actuated under control of the "1 to 7" annas keys 77 and the rack 90, and has a transfer disk 154 with two transfer points 155, so that, each time 8 annas are added therein, the higher order annas wheel 156 is turned one step. Therefore, the construction of the totalizer wheels is such that each step of movement of the annas wheel 156 is equal to the addition of "8" annas.

The annas wheel 156 has 20 teeth and a transfer disk 157 with ten transfer points 158, so that, each time the wheel 156 is moved two steps, which equals 16 annas, the lower order rupees wheel 159 is turned one step to add 1 rupee. The wheel 156 also receives one step of movement by the rack 120 each time the machine is operated with one of the "8 to 15" annas keys depressed.

The rupees wheel 159 has 20 teeth and has a transfer disk 160 with two transfer points 161, so that, for each 10 rupees added therein, 1 rupee is transferred to the next higher order rupee wheel 159 and so on upwardly for each of the successively higher order rupee wheels. These wheels 159 are actuated, also, by the racks 139 under control of the rupees keys 79.

Figure 12:
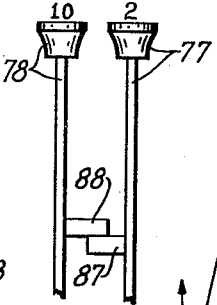
Fig. 12 is a detail showing the overlapping key pins of the "10" and the "2" annas keys.

Thus, the pies wheel 150 is controlled by the pies keys 75 and 76. The annas wheel 153 is controlled by the "1 to 7" annas keys 77 when any of those keys are operated alone. This wheel 153 is also controlled by the "9 to 15" annas keys 78 to add various amounts from 1 to 7, because the pins 88 of the "9 to 15" annas keys 78 overlie the pins 87 of the "1 to 7" annas keys, as shown in Figs. 11 and 12. Therefore, should the "13" annas key 78 be depressed, it automatically depresses the "5" annas key 77, so that the wheel 153 is turned to add "5" annas and the wheel 156 is turned one step to add "8" annas, thus giving the total of "13" annas added according to the "13" annas key depressed.

The "9" key 78 and "1" key 77 add "8" on wheel 156 and "1" on wheel 153. The "15" key 78 and "7" key 77 add "8" on wheel 156 and "7" on wheel 153. The "8" annas key 78 has no key opposite it, so this "8" key adds "8" into wheel 156 by causing it to move one step, just as the "9 to 15" keys each cause one step of movement of wheel 156, which is the equivalent of adding "8" each time into this wheel 156.

The complete transfer mechanism is shown in the above-mentioned Ellis patents and in the Williams et al. patent.

Printer

The printing mechanism, as previously stated, is of the type used in the well-known Ellis machines having a traveling carriage. However, the invention is not in any way limited to a traveling carriage machine, because it will function exactly in the same manner if used in a machine with a non-traveling carriage.

The particular problem involved herein, as stated at the outset of this case, is the control of the printing of the annas from the "1 to 7" annas keys 77 and from the "8 to 15" annas keys 78.

The printing of the pies from the "1 to 11" pies keys 75 and 76 is standard construction and need not be described in detail herein. Likewise the printing of the rupees from the rupees keys 79 is done in the regular way. Also the printing of sub-totals and totals from the totalizers requires no special manipulations on the part of the operator, the pies and rupees type being set in the usual manner. However, the printing of the annas under control of the totalizer is also accomplished without any special manipulation on the part of the operator, since the novel mechanism to be described automatically controls the annas type members so that they will be properly set up for correct printing.

Figure 13:
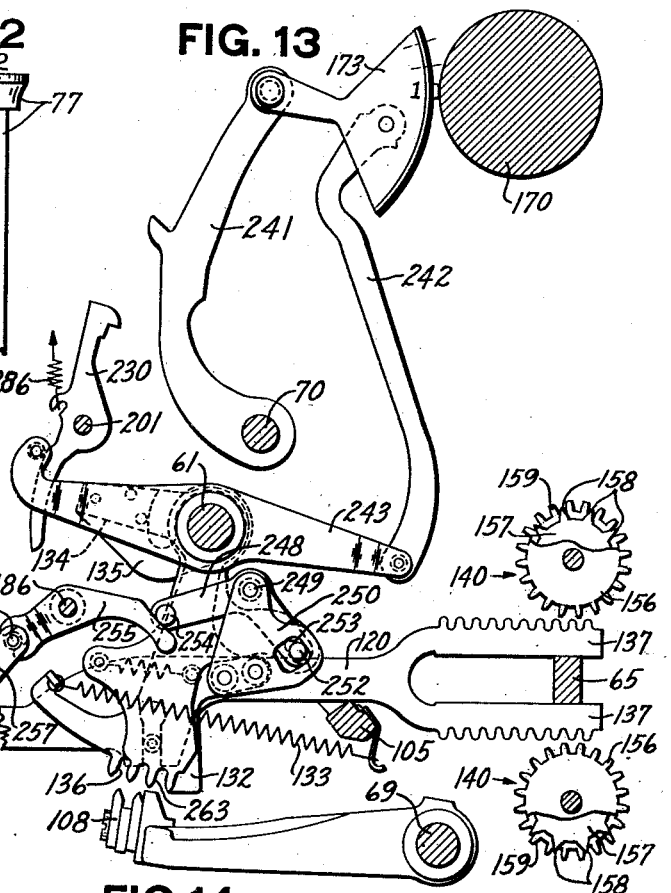
Fig. 13 shows the control of the "10 to 15" annas printing member by the "1 to 7" anna keys, the parts being in their moved or printing positions.

The only part of a carriage shown herein is a platen 170 (Figs. 3, 4, 8, and 13), with which co-operate a pies type segment 171 (Fig. 5) having the characters "1" to "11"; an annas type segment 172 (Figs. 3, 4, and 5) having the characters "0" to "9" specially arranged thereon as shown, with the "8" and "9" characters above the "0" character; another annas type segment 173 (Figs. 5, 8, and 13) having a single character "1"; and nine rupees type segments 174 (Fig. 5) having the characters "0" to "9" arranged in the regular manner. Only three of these segments 174 are shown in this case.

The annas segment 172 (Figs. 3 and 4) and its setting by the "1 to 7" annas keys 77 will be described first. This segment is pivotally mounted on an operating arm 175, which is pivoted on the printer shaft 70. A setting link 176 connects the segment 172 to a differentially adjustable lever 177 pivoted on the shaft 61. The lever 177 has an integral arm 178 having a slot 179 engaging a pin 180 on a crank 181 pivoted at 182 on the previously described lever 102, which is set differentially under control of the "1 to 7" annas keys 77 to set the totalizer rack 90.

The crank 181 carries another pin 183, which operates in a slot 184 of a lever 185 pivoted on a stud 186 of a bracket 187 secured to the frame 64 and a stud 188 in the base 62. The slot 184 is normally concentric with the shaft 61, and consequently, when the lever 102 is differentially adjusted from one to seven steps in the manner described previously, the arm 178, by means of the crank 181 and its pin 180, is driven along with the lever 102. In other words, the lever 102 and the arm 178 move as a single unit when adjusted under control of the "1 to 7" annas keys 77, and therefore the lever 177 and the link 176 differentially position the segment 172 from one to seven steps in a counter-clockwise direction to print the number of annas corresponding to the key 77 which has been depressed.

The arm 178 has aligning notches 189, with which the aligner 108 cooperates.

To operate the segment 172 to print the character set up, there are provided the usual driving arm 190 (Fig. 3), actuating pawl 191, and power spring 192. The arm 190 has the usual slot 193 engaging a pin 194 in the arm 175. The pawl 191 is pivoted at 195 on the arm 175. The arm 190 is retained in normal position by a retaining finger 196. Also the usual eliminating control lever 197 cooperates with the arm 190 and has a tail 198 with a notch 199, in which normally lies a pin 200 on the lever 177. The lever 197 is pivoted on a rod 201 carried by a printer bracket (not shown).

Pivoted on a rod 202 (Fig. 8) is a trigger 203 engaging the finger 196. The trigger 203 has a lip 204 carrying an adjustable screw 205 adapted to be contacted by a lever 206 (Fig. 3) secured to the printer shaft 70. The shaft 70 receives an oscillation from the motor-driven shaft 68, first clockwise and then counter-clockwise, as is fully shown in the Ellis and Williams et al. patents mentioned above.

When the lever 177 is moved counter-clockwise one to seven steps, the pin 200 rocks the lever 197 and disengages it from the arm 190. Then, when the lever 206 rocks the trigger 203 and releases the finger 196 from the arm 190, the spring 192 exerts its power on the pawl 191 to rock the arm 190 clockwise very rapidly, carrying the arm 175 and the segment 172 towards the platen 170 until the arm 190 strikes a stationary bar 207. Now, due to the slot 193 in the arm 190, the arm 175 and the segment 172 continue until the type on the segment strikes the paper around the platen 170, thus imprinting on the paper the selected character "1" to "7" under control of the "1" to "7" annas keys 77.

After printing, a restoring rod 208, shown only in section and carried by arms secured to the shaft 70, restores the arms 190 and 175 and the segment 172, and a spring 209 rocks the lever 197 back into engaging position with the arm 190. A spring 210 restores the trigger 203 and the retaining finger 196 to their engaging positions with the arm 190.

When there has been no key 77 depressed, the lever 177 will not move and the pin 200 does not release the lever 197 from the arm 190, and consequently the segment cannot operate, notwithstanding the fact that the finger 196 has released from the arm 190. Therefore the "0" will not be printed when there has been no key 77 depressed.

There is another control of the setting of the segment 172 from the "8" and "9" annas keys 78. It will be recalled that, when the "8" or "9" annas key 78 is depressed, the rack 120 (Figs. 3, 4, and 8) is controlled to move one step to the right. This step of movement controls the type segment 172, through means now to be described, to cause "8" or "9" to be set up into printing position on the segment 172.

The rack 120 (Figs. 3 and 14) carries a pin 211 engaged by an arm 212 secured to a shaft 213 carried by a yoke 214 formed on the bracket 187. Also secured to the shaft 213 is an arm 215 having a pin 216 projecting into a slot 217 of the lever 185. A spring 218 is used merely to take up lost motion in the linkages between the rack 120 and the arm 178.

When the "8" annas key 78 is depressed, the rack 120 is moved one step to the right and rocks the arms 212 and 215 and the shaft 213 counter-clockwise, which rocks the lever 185 clockwise, whereupon the crank 181 is rocked clockwise and the pin 180 rocks the arm 178 clockwise, and its lever 177 lowers the link 176 and rocks the segment 172 two steps from "0" position into the "8" position, so that, when the "8" key 78 is depressed alone, "8" will be printed and "8" will be added into the totalizer by movement of the wheel 156 one step. The segment 172 is operated to print the "8" and is restored in the manner described above.

During this operation, the lever 102 and the rack 90 do not move, as they are held by the zero stop pawl 91.

It might be well to state that a finger 219 on the lever 102 acts as a stop for the pin 180. The aligner 108 functions to engage the notches 109 and 189 of the lever 102 and the arm 178, respectively, to align the parts.

To print "9" when the "9" annas key 78 is depressed, the parts function as follows. Since the pin 88 on the "9" key 78 overlies the pin 87 on the "1" key 77, this key 77 is automatically depressed, and consequently the lever 102 is moved one step to operate the rack 90 to add "1" in the annas wheel 153.

This one step of movement of the lever 102 in a counter-clockwise direction takes place while the arm 178 is being moved two steps in a clockwise direction, with the result that the lever 177 and the segment 172 receive an ultimate one step in a clockwise direction, which sets the "9" character on the segment 172 in position to print "9."

During the printing of the characters "1" to "9" from the segment 172, the segment 173 (Figs. 5, 8, and 13) has not been operated, due to means to be described later.

This segment 173 is operated to print whenever any of the "10 to 15" annas keys 78 are used to register any of those amounts. However, the segment 172 is also controlled by the "10 to 15" keys 78, and this will be first described.

Depression of the "10" key 78 causes an automatic depression of the "2" key 77, and therefore the lever 102 and the arm 178 are moved two steps counter-clockwise to set up the "2" character on the segment 172, but, since the rack 120 is moved one step to the right under control of the "10" key 78, the arms 212 and 215 and the lever 185 rock the crank 181 clockwise to pull the arm 178 back two steps, thus resetting the segment 172 from the "2" printing position to the "0" printing position.

This moves the pin 200 (Fig. 3) back into the notch 199 and would prevent printing of the "0," but, since the "10" key 78 is depressed, it sets up a control, to be described later, whereby a lever 230 (Fig. 8) is rocked counter-clockwise, and this lever contacts a lip 231 (Fig. 3) on the lever 197 and releases it from the operating arm 190, so that the "0" will be printed by the segment 172 when the "10" annas key 78 is depressed.

Thus the "11" key 78 causes the segment 172 to print a "1"; the "12" key 78 causes printing of a "2"; the "13" key 78, a "3"; the "14" key 78, a "4"; and the "15" key 78, a "5," all from the segment 172.

An additional aligning device is provided for the lever 185 and associated parts. This aligning device is shown in Figs. 3, 4, 7, and 14 and includes a lever 232 pivoted at 233 on a bracket 234 secured to the base 62. The lever 232 has notches 235 and 236 adapted to engage a stud 237 on the lever 185. Normally an arm 238 of the lever 232 is held against a plate 239, fast to the bail 105 of the leading frame, by a spring 240.

If the lever 185 is not moved, then, when the bail passes from beneath the arm 238, the spring 240 rocks the lever 232 until the notch 235 engages the stud 237, thus holding the lever 185 and associated parts in proper positions until the bail 105 is returned to normal, during which return the arm 238 is contacted by the plate 239 and rocked clockwise to normal position, thus disengaging the notch 235 from the stud 237.

If the lever 185 has been moved as shown in Fig. 4, the notch 236 engages the stud 237 to properly align the lever 185 and associated parts.

The operation and control of the type segment 173 (Figs. 8 and 13) will now be described. The segment 173 is pivoted to an arm 241 loose on the shaft 70. A link 242 connects the segment 173 to a lever 243 having a hub 244 journaled on the shaft 61. The segment 173 has a single type "1" normally two steps of movement below the printing line position.

Also secured to the hub 244 is an arm 245 (Fig. 10) having a slotted finger 246, into which projects a pin 247 of a crank 248 pivoted at 249 on a plate 250 secured to the previously described lever 132 by studs 251 (see also Fig. 9). The crank 248 has another pin 252 normally held against the left side of a slot 253 in the plate 250 by a pin 254 on the crank 248 contacting a lever 255 pivoted on the stud 186. The lever 255 is held in the position shown in Fig. 8 by a pin 256 on a lever 257 pivoted on the shaft 213, which lever 257 has another pin 258 resting on a raised section 259 of a bar 260 secured to the side of the rack 90.

When the rack 120 is moved one step by the lever 132 upon depression of the "8" or "9" key 78, a spring 261, connected to the lever 132 and the arm 245, rocks the arm 245 and the lever 243 one step, which raises the segment 173 one step, but, as this is a blank position, no printing takes place from the segment 173.

When the "9" key 78 is depressed, the rack 90 moves one step as previously described, but the raised section 259 is long enough so that the pin 258 holds the pin 252 against the left side of the slot 253.

However, when any of the "10 to 15" keys is depressed, the rack 90 moves from two to seven steps and the spring 261 then rocks the arm 245 counter-clockwise one step, as the pin 258 is permitted to move down onto the lower surface 262 of the bar 260. The pin 252 now is against the right side of the slot 253. Now, since the arm 245 and the lever 243 have been moved one step by the spring, due to the fact that the rack 90 has moved at least two steps, and since the lever 132 is moved one step caused by the depression of a "10 to 15" key 78, the arm 245 and the lever 243 also receive this additional step, thus moving the "1" on the segment 173 into printing line position. The arm 245 has aligning notches 263 to cooperate with the aligner 108.

Thus it can be seen that the "1" on the segment 173 is moved into position only when the rack 90 associated with the "1 to 7" keys 77 has moved at least two steps.

To operate the segment 173 to print, there is an arm 270 connected by a pin 271 and a slot 272 to the arm 241. The arm 270 is operated by a pawl 273 and a spring 274 when the trigger 203 releases the finger 196 as described above.

However, there are certain non-print controls to be considered. The lever 230, pivoted on the rod 201, has a tail 275 with a notch 276 cooperating with a pin 277 on the lever 243. This slot is long enough to prevent release of the lever 230 when the lever 243 is moved only one step, and also prevents release of the lever 230 when the lever 243 is not moved. Therefore, even though the trigger 203 releases the finger 196, the segment 173 will not print under these two conditions. However, when the lever 243 is moved two steps, the pin 277 acts on the tail 275 to release the lever 230 from the arm 270 to permit the segment 173 to be operated to print "1."

A spring 286 restores the lever 230 after printing has taken place.

In taking totals or sub-totals from the totalizers to print the amounts therein, the above-described compensating or type control mechanisms function to cause the type segments 172 and 173 to be properly set to print correctly.

Specifically, if the annas wheel 153 has any amount from 1 to 7 therein and if the annas wheel 156 has nothing therein, the segment 172 will be adjusted by the rack 90 to select the one of the characters "1" to "7" to print.

If the wheel 153 has an amount of 2 or above—for example, 6—and if the wheel 156 has 1 therein, the rack 90 will select the type character according to the amount therein—namely, 6—and the rack 120 will move one step, which represents "8." Since 6 plus 8 equals 14, the arm 178 is moved under control of the rack 120, and the type segment 172 is moved back two steps, from "6" to "4." At the same time, the segment 173 is moved one extra step by the arm 245 under control of the rack 90, so that the "1" is in printing position.

Therefore, "14" will be printed by the segments 173 and 172, which represents the total of 6 annas from the wheel 153 and 8 annas from the wheel 156.

In Fig. 2, there is shown one form of a card 272 which may be printed by the machine embodying this invention. In the "debit" and "credit" columns, the printing is done under control of the keys 75 to 79. In detail, the groups of figures marked "278" are printed by the rupees type segments 174 (Fig. 5); those marked "279," by the annas type segment 173; those marked "280," by the annas segment 172; and those marked "281" by the pies segment 171.

In the "balance" column, the printing is done under control of the totalizers. The group of figures marked "282" is printed by the rupees type segments 174 under control of the rupees totalizer wheels 159; the figures marked "283" are printed by the annas type segment 173 under control of the annas totalizer wheel 156; the figures marked "284" are printed by the annas type segment 172 under control of the annas totalizer wheel 153; and the figures marked "285"

are printed by the pies type segment 171 under control of the pies totalizer wheel 150.

Since the operations of the various devices have been described fully along with the detailed descriptions of the parts, it is not deemed necessary to describe the operation of the machine again.

While the form of mechanism herein shown and described is admirably adapted to fulfill the objects primarily stated, it is to be understood that it is not intended to confine the invention to the form or embodiment herein disclosed, for it is susceptible of embodiment in various forms all coming within the scope of the claims which follow.

What is claimed is:

1. In a machine of the class described, the combination of two printing members; setting means for each member; a bank of keys to control each setting means; and means associated with each setting means to cause each printing member to be controlled by both banks of keys.

2. In a machine of the class described, the combination of two printing members; setting means for each member; a bank of keys to control each setting means; and means associated with one of the setting means to cause one printing member to be controlled by both banks of keys.

3. In a machine of the class described, the combination of two printing members; setting means for each member; a bank of keys associated with each setting means to control said setting means; and means intermediate each bank of keys and its associated printing member for effecting an additional control of the printing members by its unassociated bank of keys.

4. In a machine of the class described, the combination of an adjustable type carrier adjustable to print various characters; an actuator therefor; connecting elements between the said type carrier and said actuator whereby the type carrier is adjusted by the actuator; a second type carrier; a second actuator; connecting elements between the second type carrier and the second actuator; a device on the first-named actuator to actuate one element of the connections between the second actuator and the second type carrier to modify the adjustment of the second type carrier from the position to which it is set by the second actuator; and means on the second actuator to actuate one element of the connections between the first-named actuator and the first-named type carrier to modify the adjustment of the first type carrier from the position to which it is set by the first actuator, whereby both type carriers are adjusted by the combined movements of both actuators.

5. In an accounting machine, the combination of a totalizer having two adjacent denominational orders employing one system of numeration, two key-controlled differential actuators for entering amounts in said two orders of said totalizer, a printing member associated with each of said actuators, and means for setting each printing member under the joint control of the two actuators so as to effect printing of amounts in another system of numeration.

6. In an accounting machine, the combination of a totalizer having two adjacent denominational orders employing one system of numeration, two key-controlled differential actuators for entering amounts in said two orders of said totalizer, a printing member associated with each of said actuators, a driving connection between each printing member and its associated actuator, and means including an element on each actuator for imparting, when said actuator is moved through a predetermined distance, an additional amount of movement to the driving connection associated with the other actuator so as to effect printing of amounts in another system of numeration.

7. In an accounting machine, the combination of a totalizer having two adjacent denominational orders designed to use a radix of eight, two key-controlled differential actuators for entering amounts in the two orders of said totalizer, a printing member associated with each of said actuators, said printing members being adapted for use with a radix of ten, a driving connection between each printing member and its associated actuator, and means including an element on each actuator for imparting, when said actuator is moved through a predetermined distance, an additional amount of movement to the driving connection associated with the other actuator so as to effect printing of amounts based on a radix of ten.

8. In a machine of the class described, the combination of a type carrier bearing a plurality of individual printing type, said carrier being adjustable so as to locate any of the various type in printing position; a key-controlled differentially-movable actuator therefor; driving connections between the actuator and the type carrier whereby the type carrier is differentially adjusted by the actuator; a second key-controlled differentially-movable actuator; means operatively connected to one element of said driving connections; and a device on said second actuator connected to said means to enable the second-named actuator to operate said means and thereby operate said one element when the second actuator moves through a certain position to thereby enable the second actuator to readjust the type carrier to a position other than the position to which the type carrier is adjusted by the first-named actuator.

9. In a machine of the class described, the combination of a type carrier adjustable to print various characters; a differentially positionable actuator therefor; manipulative devices for controlling the differential positioning of said actuator; connecting elements between the actuator and the type carrier whereby the type carrier is adjusted to select a desired character for printing; a second differentially positionable actuator; manipulative devices for controlling the differential positioning of said second actuator; a device on the second actuator; and connections between the device and one element of the connecting elements to enable the second actuator, when moved through a certain position, to operate said one of said connecting elements, said one element being movable to modify the adjustment of the type carrier to select a character to be printed which is different from the character selected by the said first-named actuator.

10. In a machine of the class described, the combination of a printing member; setting means for differentially setting the printing member, comprising a plurality of elements; a bank of keys to control the positioning of the setting means to set the printing member under control thereof; a second setting means comprising a plurality of elements; a second bank of keys to control the positioning of the second setting means; and means connecting one element of the first-named setting means with one element of the second-named setting means and controlled by the second setting means to modify the setting of the printing member from the position to which the member is set by the first-named setting means under control of the first bank of keys into another position.

11. In a machine of the class described, the combination of a printing member; setting means for differentially setting the printing member, comprising a plurality of elements; a bank of keys to control the positioning of the setting means to set the printing member under control thereof; a second setting means comprising a plurality of elements; a second bank of keys to control the positioning of the second setting means; and means connecting one element of the first-named setting means with one element of the second setting means and controlled by the second setting means to modify the setting of the printing member from the position to which the printing member is set by the first-named setting means whereby the printing member is set into another position when a certain key of the second bank of keys is operated.

12. In a machine of the class described, the combination of a printing member; setting means for differentially setting the printing member, comprising a plurality of elements; a bank of keys to control the positioning of the setting means to set the printing member into certain selected positions; a second setting means comprising a plurality of elements; a second bank of keys to control the positioning of the second setting means; and means connecting one element of the first setting means with one element of the second setting means and controlled by the second setting means to modify the setting of the printing member from the said selected position to which the printing member is set by the first-named setting means when any except a certain one of said keys of the second bank of keys is operated in conjunction with a key in the first bank of keys.

PAUL H. WILLIAMS.

REFERENCES CITED

The following references are of record in the file of this patent:

UNITED STATES PATENTS

| Number | Name | Date |
| --- | --- | --- |
| 1,203,863 | Ellis | Nov. 7, 1916 |
| 1,980,822 | Phinney | Nov. 13, 1934 |
| 1,998,715 | Garbell | Apr. 13, 1935 |
| 2,202,948 | Fettig | June 4, 1940 |
| 1,128,409 | Cleal | Feb. 16, 1915 |
| 2,066,764 | Campbell | Jan. 5, 1937 |
| 1,359,173 | Horton | Nov. 16, 1920 |
| 2,057,606 | Campos | Oct. 13, 1936 |

Certificate of Correction

Patent No. 2,433,679.

December 30, 1947.

PAUL H. WILLIAMS

It is hereby certified that errors appear in the printed specification of the above numbered patent requiring correction as follows: Column 7, line 61, after the word "keys" insert *78*; column 14, line 64, strike out "said"; and that the said Letters Patent should be read with these corrections therein that the same may conform to the record of the case in the Patent Office.

Signed and sealed this 16th day of March, A. D. 1948.

[SEAL]

THOMAS F. MURPHY,
*Assistant Commissioner of Patents.*